(12) United States Patent
Bai et al.

(10) Patent No.: US 12,591,786 B2
(45) Date of Patent: Mar. 31, 2026

(54) INTELLIGENT AMMUNITION CO-EVOLUTION TASK ASSIGNMENT METHOD

(71) Applicant: HARBIN INSTITUTE OF TECHNOLOGY, Harbin (CN)

(72) Inventors: Yuliang Bai, Harbin (CN); Ningyu Wang, Harbin (CN); Yongzhi Shan, Harbin (CN); Long Zhang, Harbin (CN); Liangchen Xu, Harbin (CN); Yuan Li, Harbin (CN); Xiaodong Ma, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 899 days.

(21) Appl. No.: 17/866,576

(22) Filed: Jul. 18, 2022

(65) Prior Publication Data

US 2022/0374722 A1 Nov. 24, 2022

(30) Foreign Application Priority Data

Dec. 27, 2021 (CN) .......................... 202111616839.4

(51) Int. Cl.
*G06N 3/00* (2023.01)
*F41H 11/02* (2006.01)
*G06N 3/126* (2023.01)

(52) U.S. Cl.
CPC ............. *G06N 3/126* (2013.01); *F41H 11/02* (2013.01)

(58) Field of Classification Search
None
See application file for complete search history.

(56) References Cited

U.S. PATENT DOCUMENTS 6,497,169 B1 * 12/2002 Khosla ...................... F41G 3/04
702/144
2007/0244673 A1 * 10/2007 Khosla ................. G06Q 10/067
703/2

(Continued)

OTHER PUBLICATIONS

Ruining et al ("Improved Genetic Algorithm for Weapon Target Assignment Problem" 2021) (Year: 2021).*

(Continued)

*Primary Examiner* — Lut Wong
(74) *Attorney, Agent, or Firm* — Hemisphere Law, PLLC

(57) ABSTRACT

An intelligent ammunition co-evolution task assignment method is disclosed. The method includes the following steps. A chromosome gene encoding of genetic algorithm for ammunition assignment scheme of multi-platform interception operation is performed. A fitness of chromosome individual function in a genetic population is calculated according to a threat degree of an intercepting target in the ammunition assignment scheme and an interception probability of the intercepting target by different ammunition launching platforms. A probability ranking sequence of effective interception of the intercepting target by different ammunition launching platforms is obtained, and a genetic algorithm selection operation is performed on the chromosome individuals according to probability values of effective interception in descending order of priority. Crossover and/or mutation are performed on the selected chromosome individuals to obtain a next generation genetic population and the above steps are repeated until termination conditions are met to obtain the final ammunition assignment scheme.

3 Claims, 4 Drawing Sheets

(56) References Cited

U.S. PATENT DOCUMENTS

| | | | |
|---|---|---|---|
| 2014/0108077 | A1 | 4/2014 | Samdahl et al. |
| 2015/0317595 | A1 | 11/2015 | De et al. |
| 2019/0295013 | A1 | 9/2019 | Lhota et al. |
| 2020/0386520 | A1* | 12/2020 | Lam ..................... F41G 7/2206 |

OTHER PUBLICATIONS

Guangsheng et al ("A Survey of Intelligent Optimization Algo-rithms for Weapon Target Assignment WTA Problem" 2020) (Year: 2020).*
Wang et al ("Genetic Algorithm-Based Variable Value Control Method for Solving the Ground Target Attacking Weapon-Target Allocation Problem" 2019) (Year: 2019).*
Lee et al ("A Genetic Algorithm With Domain Knowledge for Weapon-Target Assignment Problems" 2002) (Year: 2002).*
Li et al ("Ammunition Type Optimization Based on Damage Ability Matching" 2021) (Year: 2021).*

* cited by examiner

INTELLIGENT AMMUNITION CO-EVOLUTION TASK ASSIGNMENT METHOD

CROSS REFERENCE TO RELATED APPLICATION

This patent application claims the benefit and priority of Chinese Patent Application No. 202111616839.4 filed on Dec. 27, 2021, the disclosure of which is incorporated by reference herein in its entirety as part of the present application.

TECHNICAL FIELD

The present disclosure relates to the technical field of ammunition task assignment, and more specifically, to an intelligent ammunition co-evolution task assignment method.

BACKGROUND ART

Cooperative operation is very important for multi-platform air defense system. The limited resources of a single platform restrict the maximization of its operational effectiveness. Without considering the cooperation of multi-platform air defense system, all platforms will degenerate into individual sets and cannot give full play to the overall operational effectiveness under the condition of multi-platform cooperation. The goal of task assignment is to achieve the best defense effect, so task assignment is a very important problem in multi-platform air defense. The quality of our own interception resource assignment scheme directly affects the effect of multi-platform operations. Therefore, in order to maximize the effectiveness of multi-platform operations, it is necessary to carry out research on multi-platform cooperative air defense task assignment.

The programming of traditional genetic algorithm is complex in the process of optimization calculation. First, the problems need to be encoded, and then the problems after finding the optimal solution need to be decoded. And in the process of solving, the selection of initial parameters seriously affects the quality of the solution, and the selection of these parameters mostly depends on experience at present. Moreover, the feedback information of the network is not used in time when the solution is calculated, which causes the search speed of the algorithm to be relatively slow, and it needs more training time to get a more accurate solution. For the problem of multi-interceptor target assignment, because the interceptor intercepts the target for a short time. And the performance of the computer on the interceptor is limited, so it is necessary for the multi-interceptor target assignment method to meet the requirements of small computation and fast convergence. In addition, the multi-interceptor target assignment problem belongs to the complete problem in the non-deterministic polynomial (NP) problem with polynomial complexity, i.e., NP complete problem. When the number of interceptors and targets increases, the difficulty of solving the target assignment problem by using the centralized method increases exponentially, which is difficult to meet the rapidity requirements of multi-interceptor target assignment.

Therefore, how to provide an intelligent ammunition co-evolution task assignment method with excellent assignment effect and meeting the requirements of rapid convergence is an urgent problem for those skilled in the art.

SUMMARY

In view of the above, an object of the present disclosure is to provide an intelligent ammunition co-evolution task assignment method, which adopts an improved genetic algorithm task assignment method based on the greedy principle. The effectiveness of intelligent ammunition co-evolution task assignment is higher, it is more purposeful to seek the best solution, and the convergence speed is fast and the genetic generation number is small.

In order to achieve the above purpose, technical solutions of the present disclosure are specifically described as follows.

An intelligent ammunition co-evolution task assignment method includes the following steps.

S1. A chromosome gene encoding of genetic algorithm for ammunition assignment scheme of multi-platform interception operation is performed.

S2. A fitness of chromosome individual function in a genetic population is calculated according to a threat degree of an intercepting target in the ammunition assignment scheme and an interception probability of the intercepting target by different ammunition launching platforms.

S3. A probability ranking sequence of effective interception of the intercepting target by different ammunition launching platforms is obtained according to the fitness of the chromosome individual function in the contemporary genetic population, and a genetic algorithm selection operation is performed on the chromosome individuals according to probability values of effective interception in descending order of priority.

S4. Crossover and/or mutation are performed on the chromosome individuals selected in the S3 to obtain a next generation genetic population and the S2 is repeated until termination conditions are met to obtain the final ammunition assignment scheme.

Preferably, the S1 includes that each chromosome is encoded as an ammunition assignment scheme, a gene sequence in each chromosome is encoded as a target sequence, and a value of each gene in each chromosome is encoded as an allocated ammunition launching platform number.

Preferably, a fitness calculation method of the chromosome individual function in the genetic population in S2 is as follows:

$$f(X) = \sum_{j=1}^{n} f(X_{ji}) = \sum_{j=1}^{n} v_j \cdot p_{ji}$$

wherein $v_j$ is the threat degree of the j-th target, and $p_{ji}$ is the interception probability of the i-th fire unit against the j-th target.

Preferably, the S3 includes the following steps. If an ammunition quantity requirement for a single launching platform is met, an ammunition launching platform corresponding to the maximum probability value of effective interception is selected as a selected contemporary chromosome individual. And if the quantity requirement is not met, an ammunition launching platform with a lower probability value of effective interception is selected as a selected contemporary chromosome individual, and it is executed downward in the order of priority until the assignment of the ammunition launching platform to the current intercepting target is completed.

According to the above technical scheme, compared with the prior art, the disclosure has the following beneficial effects.

Aiming at the problem of slow convergence of the traditional genetic algorithm, on the basis of ensuring the global optimization and based on the greedy principle, the disclosure obtains the optimal gene sequence in each round of genetic operation and performs the greedy principle operation on the local parts to ensure that the algorithm converges quickly and the genetic generation number is minimum while having the optimal fitness function value.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

Figure 1:
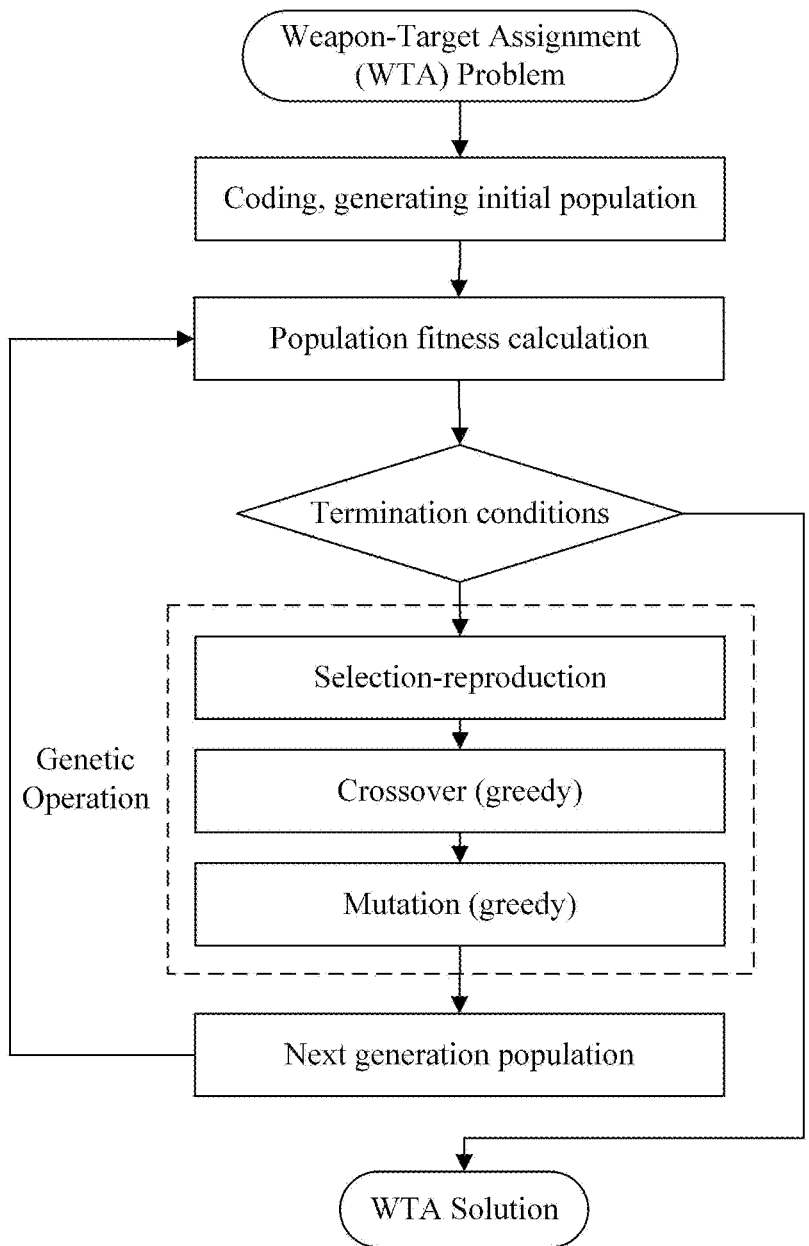
FIG. 1 is the calculation flow chart of the improved genetic algorithm based on the greedy principle provided by the embodiments of the disclosure.

Technical solutions of the embodiments in the present disclosure will be clearly and completely described below with reference to the attached drawings. Obviously, the described embodiments are only part of the embodiments of the present disclosure, not all of them. Based on the embodiments of the present disclosure, all other embodiments obtained by persons of ordinary skill in the art without creative work shall fall within the protection scope of the present disclosure.

According to the specific requirements of the interception operation problem, this embodiment determines the problem constraint conditions and coding method, and constructs the fitness function of the problem. After the initial population is generated, the solution is obtained by imitating biological heredity and adopting genetic operations, i.e., crossover, selection-reproduction, mutation, etc., which is expressed as the next generation population in the genetic algorithm to improve the fitness function value of the population. The higher the fitness function value is, the better the chromosome of the individual is. At the same time, the gene coding mode on the chromosome, that is, the WTA (Weapon-Target Assignment) solution, is also close to the optimal.

The intelligent ammunition co-evolution task assignment method provided by the embodiment includes the following steps.

S1. A chromosome gene encoding of genetic algorithm for ammunition assignment scheme of multi-platform interception operation is performed.

In one embodiment, according to the characteristics of multi-platform air defense operations, the decimal coding method is adopted for the assignment scheme of interception operations, that is, chromosome gene coding. Each chromosome represents an assignment scheme, and the gene sequence in the chromosome represents the target sequence. The number of genes is the same as the number of the targets. The value of each gene in the chromosome represents the assigned air defense missile number, which is also coded in decimal system, that is:

$$X = \{x_1, x_2, \ldots, x_i, \ldots, x_n\} \ (x_i = 1, 2, \ldots, m) \tag{1}$$

For example, when the number of targets is 5, the chromosome length is 5, the position number on each chromosome represents different targets, and the gene code on each position represents the sequence number of intercepting fire units. For example, the coding information of a chromosome is (1 3 5 4 2), which means that the first missile intercepts the first target, the third missile intercepts the second target, the fifth missile intercepts the third target, and so on.

According to equation (1), there are $n^m$ assignment schemes in total. Based on the coding method shown in equation (1), MATLAB is used to randomly generate the initial population with a population size of $N_p$. In order to increase the diversity of population genes and take into account the calculating speed of the algorithm, the population size selected in this embodiment was:

$$N_p = \frac{1}{4} n \cdot m \tag{2}$$

S2. A fitness of chromosome individual function in a genetic population is calculated according to a threat degree of an intercepting target in the ammunition assignment scheme and an interception probability of the intercepting target by different ammunition launching platforms.

In one embodiment, the fitness calculation method of chromosome individual function in genetic population is as follows:

$$f(X) = \sum_{j=1}^{n} f(X_{ji}) = \sum_{j=1}^{n} v_j \cdot p_{ji} \tag{3}$$

Wherein, $v_j$ is the threat degree of the j-th target, and $p_{ji}$ is the interception probability of the i-th fire unit against the j-th target.

In genetic algorithm, the fitness function value represents the individual's adaptability to the living environment, that is, the measure of the quality of the assignment scheme. The fitness function value of an individual is a non-negative real number. The better the fitness function value of an individual in the population, the better the adaptation of the individual to the environment, and the better the scheme represented by the individual. The higher the average fitness function value of the population, the better the adaptation of the population to the environment, the higher the degree of population evolution, and the better the average distribution scheme of the whole population.

S3. A probability ranking sequence of effective interception of the intercepting target by different ammunition launching platforms is obtained according to the fitness of the chromosome individual function in the contemporary genetic population, and a genetic algorithm selection operation is performed on the chromosome individuals according to probability values of effective interception in descending order of priority.

In one embodiment, under the condition that the ammunition quantity requirement for a single launching platform is met, the launching platform with the maximum probability value of the interception target i is selected for interception. If the quantity requirement is not met, it will be extended backward, and the launching platform with the second interception probability of intercepting target i is selected for interception, and so on until the assignment of ammunition launching platform for the current intercepting target is completed.

S4. Crossover and/or mutation are performed on the chromosome individuals selected in the S3 to obtain a next generation genetic population and the S2 is repeated until termination conditions are met to obtain the final ammunition assignment scheme.

Figure 2:
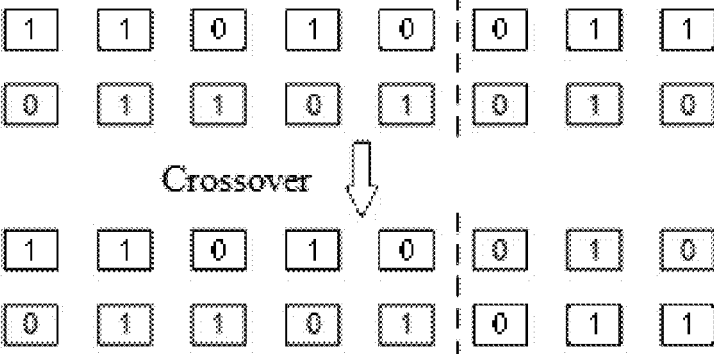
FIG. 2 is the schematic diagram of crossover operation of the genetic algorithm provided by the embodiments of the disclosure.

It should be noted that genetic operation is the core of population evolution and the fundamental source of generating new individuals and improving population diversity. Chromosome genetic operation mainly includes selection-reproduction, crossover and mutation. Among them, the crossover operator changes the chromosome gene sequence greatly, which is used for global optimization in the algorithm, and the mutation operator changes the chromosome gene sequence slightly, which is used for local optimization in the algorithm. As shown in FIG. 2, the principle of chromosome crossover operation is shown.

The improved genetic algorithm based on greedy principle is adopted. Compared with the genetic algorithm of cooperative population evolution mentioned above, the effectiveness of the genetic algorithm based on the greedy principle is higher.

In the task assignment simulation of multi-platform air defense missile, four algorithms were used for comparative analysis, including basic genetic algorithm, improved genetic algorithm based on co-evolution, improved genetic algorithm based on greedy principle and improved genetic algorithm based on co-evolution and greedy principle. It will be analyzed from several aspects, such as the time required for a single simulation, the generation number of optimal fitness function values, and the average of initial fitness function values.

The number of targets was set as 12 and the number of air defense platforms were set as 16. Other conditions for setting initial values are as follows.

The selection of target threat degree is shown in Table 1.

TABLE 1

| Target threat degree | | | | | | | | | | | | |
|---|---|---|---|---|---|---|---|---|---|---|---|---|
| Target | 1 | 2 | 3 | 4 | 5 | 6 | 7 | 8 | 9 | 10 | 11 | 12 |
| Threat degree | 0.47 | 0.97 | 0.76 | 0.22 | 0.48 | 0.77 | 0.83 | 0.54 | 0.47 | 0.97 | 0.76 | 0.22 |

The interception probability of different air defense platforms to targets is shown in Table 2.

TABLE 2

| Interception probability of different air defense platforms to targets | | | | | | | | | | | | |
|---|---|---|---|---|---|---|---|---|---|---|---|---|
| | Target | | | | | | | | | | | |
| Platform | 1 | 2 | 3 | 4 | 5 | 6 | 7 | 8 | 9 | 10 | 11 | 12 |
| 1 | 0.15 | 0.55 | 0.65 | 0.55 | 0.48 | 0.40 | 0.44 | 0.85 | 0.15 | 0.55 | 0.65 | 0.55 |
| 2 | 0.65 | 0.70 | 0.75 | 0.48 | 0.52 | 0.52 | 0.55 | 0.55 | 0.65 | 0.70 | 0.75 | 0.48 |
| 3 | 0.90 | 0.45 | 0.50 | 0.20 | 0.20 | 0.72 | 0.70 | 0.70 | 0.90 | 0.45 | 0.77 | 0.20 |
| 4 | 0.75 | 0.70 | 0.56 | 0.72 | 0.72 | 0.53 | 0.75 | 0.75 | 0.75 | 0.70 | 0.83 | 0.72 |
| 5 | 0.70 | 0.65 | 0.36 | 0.56 | 0.56 | 0.28 | 0.60 | 0.60 | 0.70 | 0.65 | 0.54 | 0.56 |
| 6 | 0.20 | 0.28 | 0.52 | 0.28 | 0.28 | 0.44 | 0.65 | 0.32 | 0.20 | 0.28 | 0.47 | 0.28 |
| 7 | 0.85 | 0.44 | 0.64 | 0.32 | 0.20 | 0.72 | 0.45 | 0.20 | 0.85 | 0.44 | 0.64 | 0.32 |
| 8 | 0.45 | 0.35 | 0.35 | 0.90 | 0.00 | 0.35 | 0.00 | 0.75 | 0.45 | 0.35 | 0.35 | 0.90 |
| 9 | 0.15 | 0.40 | 0.55 | 0.55 | 0.85 | 0.47 | 0.44 | 0.44 | 0.15 | 0.40 | 0.55 | 0.55 |
| 10 | 0.65 | 0.52 | 0.70 | 0.70 | 0.55 | 0.97 | 0.55 | 0.55 | 0.65 | 0.52 | 0.70 | 0.70 |
| 11 | 0.90 | 0.72 | 0.45 | 0.45 | 0.70 | 0.76 | 0.70 | 0.70 | 0.90 | 0.72 | 0.45 | 0.45 |
| 12 | 0.75 | 0.53 | 0.70 | 0.70 | 0.75 | 0.22 | 0.75 | 0.75 | 0.75 | 0.53 | 0.70 | 0.70 |
| 13 | 0.70 | 0.28 | 0.65 | 0.65 | 0.60 | 0.48 | 0.60 | 0.60 | 0.70 | 0.28 | 0.65 | 0.65 |
| 14 | 0.20 | 0.44 | 0.28 | 0.28 | 0.32 | 0.77 | 0.65 | 0.65 | 0.20 | 0.44 | 0.28 | 0.28 |
| 15 | 0.85 | 0.72 | 0.44 | 0.44 | 0.20 | 0.83 | 0.45 | 0.45 | 0.85 | 0.72 | 0.44 | 0.44 |
| 16 | 0.45 | 0.35 | 0.35 | 0.35 | 0.75 | 0.54 | 0.00 | 0.00 | 0.45 | 0.35 | 0.35 | 0.35 |

The number of interception units included in each air defense platform is shown in Table 3.

TABLE 3

| Number of interception units included in each air defense platform | | | | | | | | | | | | | | | | |
|---|---|---|---|---|---|---|---|---|---|---|---|---|---|---|---|---|
| Platform serial number | 1 | 2 | 3 | 4 | 5 | 6 | 7 | 8 | 9 | 10 | 11 | 12 | 13 | 14 | 15 | 16 |
| Number of units | 2 | 4 | 5 | 1 | 7 | 4 | 2 | 1 | 3 | 1 | 2 | 1 | 2 | 5 | 3 | 1 |

(1) Characteristic Analysis of Single-Pass Genetic Algorithm

1) Simulation Case 1

From the solutions of four different genetic algorithms, it can be seen that for the basic genetic algorithm and co-evolution algorithm, the genetic operation was random, so there were two different solutions in the final assignment scheme. Because two air defense platforms had the same interception probability for the same incoming target, the fitness function values of the two schemes were the same. For the algorithm based on the greedy principle, the interception probabilities of different air defense platforms were sorted. At the same time, the air defense platforms with the same interception probability were prioritized and assigned if the sequence number was small. Therefore, the final assignment schemes are shown in Table 4, the optimal fitness function value of each genetic algorithm is shown in Table 5, and the generation number comparison of the optimal fitness function values is shown in Table 6.

Figure 3:
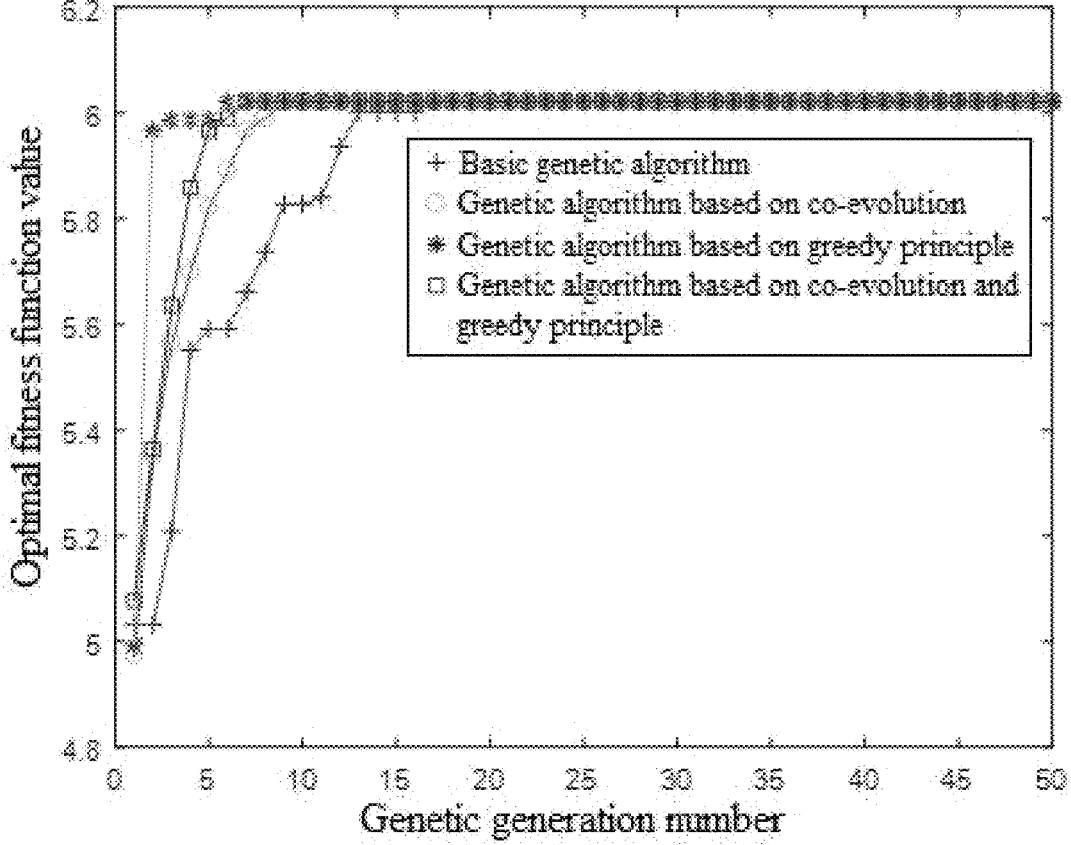
FIG. 3 is the variation curve 1 of the optimal fitness function values under different genetic algorithms provided by the embodiments of the disclosure.

It can be seen from Table 6 and FIG. 3 that the genetic generation number with the optimal fitness value: greedy principle>greedy+cooperative principle>cooperative principle>basic genetic algorithm. The greedy principle is to find the optimal solution under the local optimal condition, and to give priority to the air defense platform with the largest interception probability. Compared with the general genetic algorithm, the greedy principle is more purposeful to find the solution, so the convergence is the fastest and the genetic generation number is the smallest.

TABLE 4

Comparison of distribution schemes

| Algorithm | Scheme |
|---|---|
| Basic genetic algorithm | [11; 15; 2; 13; 9; 10; 12; 1; 3; 11; 4; 8]<br>[3; 11; 2; 13; 9; 10; 12; 1; 3; 15; 4; 8] |
| Improved genetic algorithm based on co-evolution | [3; 11; 2; 8; 9; 10; 12; 1; 11; 15; 4; 13]<br>[3; 15; 2; 8; 9; 10; 12; 1; 11; 15; 4; 13] |
| Improved genetic algorithm based on greedy principle | [3; 11; 2; 13; 9; 10; 12; 1; 3; 11; 4; 8] |
| Improved genetic algorithm based on co-evolution and greedy principle | [3; 11; 2; 13; 9; 10; 12; 1; 3; 11; 4; 8] |

TABLE 5

Optimal fitness function value of each genetic algorithm

| Algorithm | Basic genetic algorithm | Co-evolution | Greedy principle | Co-evolution + Greedy principle |
|---|---|---|---|---|
| Fitness function value | 6.0210 | 6.0210 | 6.0210 | 6.0210 |

TABLE 6

Generation number comparison of optimal fitness function values

| Algorithm | Basic genetic algorithm | Co-evolution | Greedy principle | Co-evolution + Greedy principle |
|---|---|---|---|---|
| Genetic generation number | 17 | 9 | 6 | 7 |

2) Simulation Case 2

From the solution schemes shown in Table 7, it can be seen that, as in simulation case 1, the randomness was reduced by adopting the greedy principle, and the solution result also had only one assignment scheme.

TABLE 7

Assignment scheme comparison

| Algorithm | Scheme |
|---|---|
| Basic genetic algorithm | [3; 15; 2; 8; 9; 10; 12; 1; 3; 15; 4; 13]<br>[11; 15; 2; 8; 9; 10; 12; 1; 11; 15; 4; 13] |
| Improved genetic algorithm based on co-evolution | [3; 11; 2; 8; 9; 10; 12; 1; 11; 15; 4; 13]<br>[11; 15; 2; 8; 9; 10; 12; 1; 3; 11; 4; 13] |
| Improved genetic algorithm based on greedy principle | [3; 11; 2; 8; 9; 10; 4; 1; 3; 11; 3; 12] |
| Improved genetic algorithm based on co-evolution and greedy principle | [3; 11; 2; 8; 9; 10; 4; 1; 3; 11; 3; 12] |

TABLE 8

Optimal fitness function values

| Algorithm | Basic genetic algorithm | Co-evolution | Greedy principle | Co-evolution + Greedy principle |
|---|---|---|---|---|
| Fitness function value | 6.0210 | 6.0210 | 5.9864 | 5.9864 |

TABLE 9

Genetic generation number comparison of optimal fitness function values

| Algorithm | Basic genetic algorithm | Co-evolution | Greedy principle | Co-evolution + Greedy principle |
|---|---|---|---|---|
| Genetic generation number | 20 | 10 | 2 | 2 |

It can be seen from Table 9 that the time spent in the occurrence of the optimal fitness value is: greedy principle>greedy+cooperative principle>cooperative principle>basic genetic algorithm, that is, the same as case 1, which verifies the effectiveness of adopting the greedy principle and can improve the convergence speed.

Figure 4:
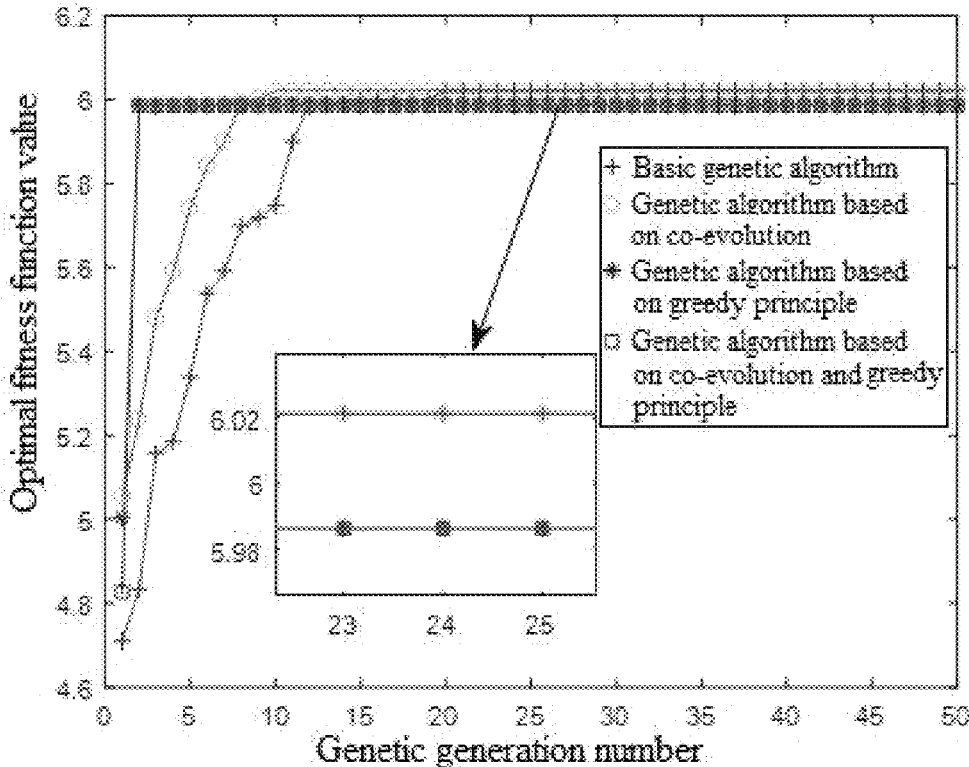
FIG. 4 is the variation curve 2 of the optimal fitness function values under different genetic algorithms provided by the embodiments of the disclosure.

As can be seen from FIG. 4, the genetic algorithm using the greedy principle fell into local optimization, that is, premature convergence. Even if the greedy principle and the cooperative principle were adopted, in the random computing simulation, due to the computational characteristics of the greedy principle, the possibility of global optimization was abandoned in the optimization process due to the local optimization, and the local optimization in the early stage was guaranteed first, resulting in the search falling into the local optimization. While the two algorithms, that is, basic genetic algorithm and the genetic algorithm based on co-evolution, were not easy to fall into local optimization although the convergence speeds were slow.

(2) Characteristic Analysis of Target Shooting Genetic Algorithm

In order to avoid the contingency caused by a single shot, the target was shot 200 times for the above simulation conditions, and the simulation results are shown in Table 10. As can be seen from Table 10, the simulation running time is: cooperative principle>basic genetic algorithm>greedy+ cooperative principle>greedy principle. That is, the simulation time of the algorithm based on greedy principle is shorter than that of other algorithms, and the simulation time of the algorithm based on cooperative principle is longer than that of other algorithms. The results are related to the characteristics of the algorithm. The greedy principle improves the convergence speed and reduces the simulation time. The cooperative population evolution principle increases the population number and reduces the simulation calculation speed. For the improved genetic algorithm based on co-evolution, the larger the number of elite populations, the longer the calculation time and the longer the simulation time. The improved genetic algorithm based on the greedy principle reduces the randomness and blind selection, and its simulation time is greatly reduced compared with the basic genetic algorithm.

TABLE 10

| Comparison of simulation time (time:s) | | | |
| --- | --- | --- | --- |
| Elite number/ Common population number | Basic genetic algorithm | Co-evolution | Greedy principle | Co-evolution + Greedy principle |
| 0.3 | 30.7480 | 41.9790 | 15.5070 | 23.9770 |
| 0.2 | 30.2490 | 39.9360 | 15.0380 | 20.7640 |
| 0.1 | 30.7320 | 35.5680 | 15.1950 | 17.5030 |

TABLE 11

| Average generation number comparison of optimal fitness function values | | | |
| --- | --- | --- | --- |
| Elite number/ Ordinary population number | Basic genetic algorithm | Co-evolution | Greedy principle | Co-evolution+ Greedy principle |
| 0.3 | 18.0150 | 11.2650 | 4.1350 | 8.7750 |
| 0.2 | 18.1550 | 10.280 | 4.2250 | 8.1250 |
| 0.1 | 17.9250 | 9.3250 | 4.4450 | 7.6050 |

It can be seen from Table 11 that the convergence generation number of the population were greatly reduced no matter whether the co-evolution principle or greedy principle is adopted. The effect of genetic algorithm based on greedy principle was better than that based on co-evolution. In the three target shooting simulations, the average generation number of the basic genetic algorithm with optimal fitness was basically stable, and the average generation number of the algorithm based on greedy principle was basically stable, because the number of the set variable elite population relative to the ordinary population had no effect on the two algorithms.

For the problem of multi-interceptor target assignment, because the interceptor intercepts the target for a short time, and the performance of the computer on the interceptor is limited, the multi-interceptor target assignment method based on greedy genetic algorithm meets the requirements of small computation and fast convergence. In addition, the multi-interceptor target assignment problem belongs to the complete problem in the non-deterministic polynomial (NP) problem with polynomial complexity, i.e., NP complete problem. When the number of interceptors and targets increases, the difficulty of solving the target assignment problem by using the centralized method increases exponentially. The genetic algorithm based on greedy principle can especially solve the fast time effective calculation requirements of large-scale interceptor assignment.

The greedy optimization algorithm is used to improve the crossover operator and mutation operator of the traditional genetic algorithm, and the improved genetic algorithm based on the greedy principle is obtained, which has the advantages of strong optimization ability and fast convergence speed. Because of the greedy principle, the assignment convergence speed has the advantages of small amount of calculation, fast solution speed and good scalability.

The above describes in detail the intelligent ammunition co-evolution task assignment method provided by the disclosure. Specific embodiments are used to explain the principle and implementation mode of the disclosure. The description of the above embodiments is only used to help understand the method and core idea of the disclosure. Meanwhile, for those skilled in the art, there will be changes in the specific implementation mode and application scope according to the idea of the disclosure. In conclusion, the contents of this specification shall not be construed as limiting the disclosure.

The above description of the disclosed embodiments enables those skilled in the art to realize or use the disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but will conform to the widest scope consistent with the principles and novel features disclosed herein.

What is claimed is:

1. An intelligent ammunition co-evolution task assignment method, comprising:

S1. performing a chromosome gene encoding of genetic algorithm for ammunition assignment scheme of multi-platform interception operation;

S2. calculating a fitness of chromosome individual function in a genetic population according to a threat degree of an intercepting target in the ammunition assignment scheme and an interception probability of the intercepting target by different ammunition launching platforms;

S3. obtaining a probability ranking sequence of effective interception of the intercepting target by different ammunition launching platforms according to the fitness of the chromosome individual function in the contemporary genetic population, and performing a genetic algorithm selection operation on the chromosome individuals according to probability values of effective interception in descending order of priority; and S4. performing crossover and/or mutation on the chromosome individuals selected in the S3 to obtain a next generation genetic population and repeating the S2 until termination conditions are met to obtain the final ammunition assignment scheme, wherein a fitness calculation method of the chromosome individual function in the genetic population in S2 is as follows:

$$f(X) = \sum_{j=1}^{n} f(X_{ji}) = \sum_{j=1}^{n} v_j \cdot p_{ji}$$

wherein $v_j$ is the threat degree of the j-th target, and $p_{ji}$ is the interception probability of the i-th fire unit against the j-th target.

2. The intelligent ammunition co-evolution task assignment method of claim 1, wherein the S1 comprises: encoding each chromosome as an ammunition assignment scheme, encoding a gene sequence in each chromosome as a target sequence, and encoding a value of each gene in each chromosome as an allocated ammunition launching platform number.

3. The intelligent ammunition co-evolution task assignment method of claim 1, wherein the S3 comprises: if an ammunition quantity requirement for a single launching platform is met, selecting an ammunition launching platform corresponding to the maximum probability value of effective interception as a selected contemporary chromosome individual; and if the quantity requirement is not met, selecting an ammunition launching platform with a lower probability value of effective interception as a selected contemporary chromosome individual, and executing downward in the order of priority until the assignment of the ammunition launching platform to the current intercepting target is completed.

* * * * *